Patented Mar. 21, 1944

2,344,624

UNITED STATES PATENT OFFICE 2,344,624

SULPHUR DYES OF THE HYDROXY-ANILI-NO-NAPHTHALENE-SULPHONAMIDE TYPE

Herbert A. Lubs and Newell M. Bigelow, Wilmington, Del., assignors to E. I. du Pont de Nemours & Company, Wilmington, Del., a corporation of Delaware No Drawing. Application May 21, 1941, Serial No. 394,490

7 Claims. (Cl. 260—133)

This invention relates to new sulphur dyes, to new intermediates suitable for making the new dyes and to processes for making the new compounds, and especially to sulphur dyes which are prepared by thionating indophenols or leucoindophenols which have an amino-naphthalene-sulphonamide group.

Heretofore, commercially important green sulphur dyes have been prepared by thionating leucoindophenols having amino-naphthalene sulphonic acid groups, such as 1-amino-4-(p'hydroxy-anilino)-naphthalene-6-(or 7)-sulphonic acid which is derived from Cleve's acid, and from a similar indophenol derived from N-phenyl peri acid, (1-phenylnaphthylamine-8-sulphonic acid). However, the dyes made with such sulphur dyes do not have as good fastness to washing or laundering as that required by the highest standards of dyeing and the dyes tend to migrate from dyed areas to adjacent undyed areas during washing. Sulphur dyes of similar shade having improved washing fastness and non-migrating properties were desired.

It is among the objects of the invention to provide sulphur dyes in shades of green, blue-green and blue which have better fastness to laundering than the sulphur dyes of the type heretofore provided. Another object of the invention is to provide leucoindophenols which upon thionation produce the new dyes. Other objects of the invention will be apparent from the following description.

The objects of the invention are attained in general by thionating one of a class of new indophenols or analogous leucoindophenols which are represented by the general formula

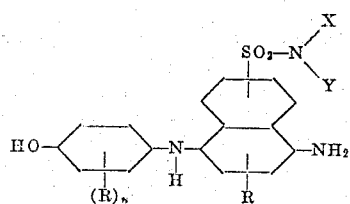

wherein the sulphonamide group is in the 6-, 7- or 8-position of the naphthalene radical with respect to the amino group; R is from a group consisting of hydrogen, halogen and methyl; $n$ is an integer not greater than 2; taken singly X is one of a group consisting of hydrogen, alkyl having 1 to 5 carbons, the corresponding monohydroxy-alkyl groups, and phenyl; taken singly Y is one of a group consisting of hydrogen and alkyl having 1 to 4 carbons and taken collectively X and Y together with N represent the residue of a cyclic amine wherein the ring contains four —CH$_2$—groups. The sulphonamides represented by the foregoing formula may be prepared in general by reacting a para-amino-phenol represented by the formula

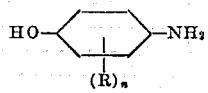

with a 1-amino-naphthalene-6(-7 or -8)-sulphonamide having the formula

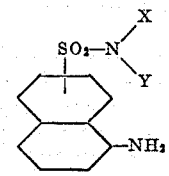

wherein X and Y have the described significance, the reaction being carried out in alkaline medium by the action of an oxidizing agent, such as sodium hypochlorite. The resulting indophenol can then be separated from the medium, or the leucoindophenol can be formed by reducing the indophenol in the medium by the action of a reducing agent, such as sodium sulfide. The dyes resulting from the thionation of either the leucoindophenol or the indophenol are identical.

The invention will be more fully set forth in the following more detailed description which includes examples that are given as illustrative embodiments of the invention and not as limitations thereof. Parts are expressed in parts by weight unless otherwise noted.

Example 1

A solution of 1.00 part of 1-amino-naphthalene-6-sulphonamide and 0.18 part of sodium hydroxide in 10.0 parts of water was chilled to 0° C. At this temperature, 0.49 part of p-aminophenol was added. The mixture was agitated until solution was complete. Then 5.00 parts of crushed ice were added. Following this, a solution of 0.670 part of sodium hypochlorite in 6.0 parts of water was added over the course of about three minutes with vigorous agitation. The temperature was not allowed to rise about 0° C. during the addition. When the addition was complete, the solution was agitated at or below 0° C. for a few minutes, then a solution of 2.40 parts of sodium sulphide crystals in a minimum of water was added. The resulting solution was allowed to warm slowly to room temperature, with agitation. During this time, reduction of the indophenol to the leucoindophenol took place. At the end of this time, the solution was again chilled to 0° C. and acidified at this temperature with 37% hydrochloric acid. The leucoindophenol, 1-amino-4-(p'-hydroxyanilino)-naphthalene-6-sulphonamide, separated out. It was filtered, washed thoroughly with water and retained as a wet paste.

A mixture of 1.46 parts of sodium hydroxide, 2.72 parts of sulphur and 4.0 parts of water was refluxed until solution of the sulphur was complete and then 1.00 part 1-amino-4-(p'-hydroxyanilino)-naphthalene-6-sulphonamide was added in the form of a wet paste. Enough additional water was added to equal a total weight of 11.00 parts. This mixture was refluxed for 24 hours.

At the end of this time, the solution was diluted with water to a total weight of 20.0 parts. The solution was heated with agitation to 75° C. A vigorous current of air was passed through the solution. Sodium hydroxide was added in quantities sufficient to keep the mixture alkaline to Clayton Yellow paper. When a spot of the reaction mixture on absorbent paper gave a dark central spot, surrounded by a clear blue ring, the aeration was stopped. Five parts of sodium chloride were added; the mixture was agitated for 10 minutes, then filtered. The filter cake was washed with 15% sodium chloride solution until the washings were neutral or weakly alkaline to phenolphthalein paper. The product was dried at 75° C.

The product was soluble in warm dilute sodium sulphide solution. Cotton goods, immersed in this dyebath, were dyed a bright, bluish green upon being developed in the air. The fastness of the dyeings to laundering was better than those made with the sulphur dye produced by thionation of the leucoindophenol derived from p-amino-phenol and the corresponding free amino-naphthalene sulphonic acid.

*Example 2*

In this example, the intermediate and the polysulphide used were identical with those of Example 1. At the start of the thionation, a solution of 0.30 part of copper sulphate pentahydrate in a minimum of water was added to the mixture. The thionation and isolation of the dye were carried out under conditions identical with those of Example 1. The resulting dye was a black, amorphous powder. Dissolved in dilute sodium sulphide, this dye dyed cotton a bright green. The fastness properties of the dyeings were excellent, particularly to laundering.

*Example 3*

A solution of 1.00 part of 1-amino-naphthalene-6-sulphon-methylamide in 10.0 parts of water and 0.20 part of sodium hydroxide was chilled to 0° C. At this temperature, 0.46 part of p-amino-phenol was added. When this had dissolved, 5.0 parts of crushed ice was added. Then a solution of 0.63 part of sodium hypochlorite in 5.0 parts of water was slowly added to the vigorously agitated solution over the course of three minutes. The mixture was stirred for three minutes more; then a solution of 2.00 parts of crystalline sodium sulphide in 2.0 parts of water was added. The solution was allowed to warm slowly to room temperature. When reduction was complete, the solution was chilled to 5° C. and neutralized at this temperature with 25% sulphuric acid. The crystalline leucoindophenol was filtered, washed, and retained as a moist paste.

A mixture of 4.00 parts of ethyl alcohol, 2.82 parts of crystalline sodium sulphide and 1.50 parts of sulphur was heated and refluxed with agitation until the sulphur had completely dissolved. The mixture was cooled to 75° C.; at this temperature one part of 1-amino-4-(p'-hydroxy-anilino)-naphthalene-6-sulphon- methylamide in the form of a moist paste was added. Then a solution of 0.31 part of nickel sulphate (hexahydrate) in a minimum of water was added. The mixture was refluxed for 60 hours. At the end of this time, it was diluted to a total weight of 40 parts. Sodium bisulphite (1.53 parts) and sodium sulphite (1.85 parts) were added, and the suspension was digested for four hours at 90° C. At the end of this time, the mixture was cooled to room temperature and filtered; the filter cake was washed thoroughly with water and dried at 70° C. The product was a dark grey powder which was soluble in warm dilute sodium sulphide solution.

A piece of cotton goods, immersed in a dyebath made by dissolving the product in a dilute water solution of sodium sulphide and then developed in a warm dilute solution of hydrogen peroxide or sodium perborate, was dyed a deep blue. The fastness properties of the dyeings were excellent.

*Example 4*

A suspension of 1.00 part of 1-amino-naphthalene-6-sulphon-dimethylamide and 0.58 part of monochlor-p-amino-phenol in 10 parts of water was chilled to 0° C. At this temperature, 0.02 part of sodium hydroxide was added. This was followed by 5.0 parts of crushed ice. Then a solution of 0.59 part of sodium hypochlorite in 3 parts of water was added to the vigorously agitated solution over the course of three minutes. The solution was agitated at or below 0° C. for five minutes more, then a solution of 1.44 parts of crystalline sodium sulphide in 1.5 parts of water was added. The solution was allowed to warm to room temperature, and held here until the deep red solution had faded to a dark yellow, then it was acidified at this temperature with 37% hydrochloric acid. The leucoindophenol was filtered, washed thoroughly with water and held as a moist paste.

A solution of polysulphide was prepared by refluxing a mixture of 0.92 part of sodium hydroxide, 2.46 parts of sulphur and 4.0 parts of water. To this polysulphide was added 1.0 part of 1-amino-4-(p'-hydroxy-anilino)-naphthalene-6-sulphon-dimethylamide, the preparation of which has just been described. If necessary, water was added to give a total of 6.0 parts. The mixture was refluxed for 24 hours. At the end of this time, it was diluted to 25.0 parts with water. The mixture was warmed to 95° C. and a vigorous current of air blown through it. Sodium carbonate was added from time to time in small quantities sufficient to keep the mixture alkaline to phenolphthalein paper. When the aeration was complete, as indicated by the spot test described in Example 1, the suspension was filtered and washed thoroughly with dilute sodium chloride solution. The product was a black powder which was soluble in dilute sodium sulphide solution.

A piece of cotton goods, immersed in a dilute aqueous sodium sulphide solution of the dye and then developed in the air, was dyed a bluish green. The dyeing was slightly bluer than those described in Example 1. The fastness properties of the dyeings were good.

*Example 5*

1-amino-4-(4'-hydroxy-anilino)-naphthalene-7-sulphonamide was prepared by the oxidation of 1-amino-naphthalene-7-sulphonamide and p-amino-phenol with sodium hypochlorite exactly as described in the case of the 1:6-isomer in Example 1.

Sodium polysulphide was prepared by refluxing 1.09 parts of sodium hydroxide, 2.04 parts of sulphur, 4.0 parts of water and 2.0 parts of the mono-ethyl ether of ethylene glycol. The polysulphide was cooled to 70° C.; to it was added 1.0 part of the leucoindophenol described above and a solution of 0.38 part of copper sulphate pentahydrate in 1.0 part of water. The mixture was refluxed for 30 hours. At the end of this time, it was diluted to a total weight of 25.0 parts with water. One-half part of sodium hydroxide and 3.0 parts of sodium carbonate were added and the solution was aerated at 90° C. If necessary, more sodium carbonate was added in quantities sufficient to keep the mixture alkaline to phenolphthalein paper. When the aeration was complete, the mixture was filtered and washed with water until neutral or weakly alkaline to phenolphthalein paper. After drying, the product was a black amorphous powder, insoluble in water but soluble in warm dilute sodium sulphide solution. Pieces of cotton goods immersed in a bath made by dissolving the product in a dilute sodium sulphide water solution were dyed, upon development in air, a bright, strong green. The fastness properties of the dyeings were excellent.

*Example 6*

A solution of 1.0 part of 1-amino-naphthalene-7-beta-hydroxy-ethyl-sulphonamide and 0.15 part of sodium hydroxide in 8.0 parts of water was chilled to 5° C. Four parts of ice were added; then a solution of 0.56 part of sodium hypochlorite in 4.0 parts of water was added to the vigorously agitated solution over the course of five minutes. The mixture was agitated at or below 0° C. for three minutes more, then a solution of 1.36 parts of crystalline sodium sulphide in an equal weight of water was added. The solution was agitated for an hour and was allowed to rise slowly to room temperature. Then it was again chilled to 0° C. and acidified at this temperature with 37% hydrochloric acid. The leucoindophenol was filtered, washed thoroughly with water and held in the form of a moist paste.

Sodium polysulphide was prepared in the usual manner from 0.97 part of sodium hydroxide, 2.10 parts of sulphur, 2.0 parts of water and 5.0 parts of ethyl alcohol. To this polysulphide was added 1.0 part of the leucoindophenol, the preparation of which has just been described, and a solution of 0.27 part of copper sulphate pentahydrate in 2.0 parts of water. The mixture was refluxed for 50 hours. The product was isolated by aeration in a suspension kept alkaline to Clayton Yellow paper, as described in previous examples.

Dissolved in warm sodium sulphide solution, this product dyed cotton, upon development in air, a strong, bright green. The fastness properties of the dyeings, particularly to laundering, were excellent.

*Example 7*

1-amino-4-(4'-hydroxy-anilino)-naphthalene-7-sulphonanilide was prepared by the oxidation of 1.0 part of 1-amino-naphthalene-7-sulphonanilide, and 0.37 part of p-amino-phenol by means of 0.50 part of sodium hypochlorite in aqueous solution at 0° C. The indophenol was reduced, as usual, with sodium sulphide. Sodium polysulphide was prepared in the usual manner from 2.38 parts of crystalline sodium sulphide, 1.59 parts of sulphur, and 4.0 parts of water. To the polysulphide was added 1.0 part of the leucoindophenol, the preparation of which has just been described, in the form of an aqueous paste containing approximately 2.0 parts of water. The mixture was thionated for 20 hours, then it was diluted to a total weight of 30 parts. Three parts of sodium hydroxide were added and the mixture was agitated at 80° C. for two hours. Then the solution was chilled to 10° C. and acidified at this temperature with dilute sulphuric acid. The precipitated dye was filtered and washed with water until the washings were no longer acid. After drying, the product was a tan powder which was insoluble in water but soluble in warm sodium sulphide solution. Cotton, immersed in this dyebath and then developed in a dilute solution of sodium perborate or hydrogen peroxide, was dyed in blue-green shades, yellower than the dyeings described in Example 4.

*Example 8*

A suspension of 1.0 part of 1-amino-naphthalene-7-sulphonanilide and 0.44 part of dichloro-amino-phenol in 8.0 parts of water was chilled to 0° C. Two-tenths of one part of sodium hydroxide was added and the mixture was agitated until solution was complete. Four parts of ice were added, then a solution of 0.37 part of sodium hypochlorite in 5.0 parts of water was added to the vigorously agitated solution over the course of three minutes. Agitation was continued for a few minutes more, then 1.04 parts of crystalline sodium sulphide were added, and the solution warmed to room temperature. When the indophenol was completely reduced, 3.0 parts of sodium chloride were added and the solution was agitated until precipitation of the leucoindophenol was completed. The precipitate was filtered off and washed with 20% salt solution until the washings were light in color. Sodium polysulphide was prepared from 1.04 parts of crystalline sodium sulphide, 0.93 part of sulphur, 2.5 parts of water and 4.8 parts of the mono-ethyl ether of ethylene glycol. To it was added 1.0 part of the above leucoindophenol. The mixture was thionated for 16 hours. Then the mixture was diluted with water and aerated at 95° C. in the presence of an excess of sodium carbonate. The precipitated dye was washed, filtered and dried.

Pieces of cotton goods dyed with this product from a sulphide bath and developed in air were colored a strong blue-green shade.

In the preparation of the intermediates, para-amino-phenol or any of its derivatives can be used which are represented by the formula

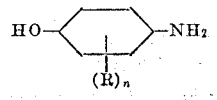

wherein R represents substituents hereinbefore described, as for example the para-amino-cresols, the para-amino-xylenols and the 1-amino-mono- and di-chloro-para-hydroxy-benzenes. As illustrations of such compounds are mentioned p-amino-2(and -3)-cresol, 2,5-dimethyl-4-amino-phenol and 1,4-dimethyl-2-hydroxy-5-aminobenzene.

Combinations of these para-amino-phenols with any of the naphthylamines represented by the formula

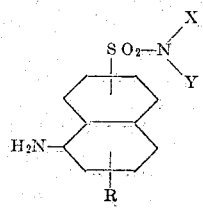

wherein R, X and Y represent the groups hereinbefore described, may be used to make the intermediates which produce the new dyes upon being thionated. As representative of such compounds are mentioned 1-amino-2-methyl-naphthalene-6-sulphon-ethyl-beta-hydroxy-ethyl-amide, 1-amino-naphthalene-7-sulphon-dimethyl-amide, 1-amino-naphthalene-8-sulphon-morpholide and 1-amino-naphthalene-8-sulphon-anilide.

As representative of other leucoindophenols which, upon thionation, produce sulphur dyes having the improved properties of the dyes hereinbefore described are mentioned 1-amino-2-methyl-4-(3':5'-dichlor-4'-hydroxy-anilino)-naphthalene-6-sulphon-beta-hydroxy-propyl-amide, 1-amino-4-(2'-methyl-4'-hydroxy-anilino)-naphthalene-7-sulphon-dimethyl-amide, 1-amino-4-(3'-chloro-4'-hydroxy-anilino)-naphthalene-7-sulphon-p-toluidide, 1-amino-3-bromo-4-(4'-hydroxy-anilino)-naphthalene-6-sulphon-piperidine and 1-amino-4-(3'-methyl-4'-hydroxy-anilino)-5-nitro-naphthalene-8-sulphon-anilide.

The new dyes contain a much smaller content of sulphur and a much larger content of nitrogen than dyes made from similar intermediates except that the naphthalene radical is substituted by a free sulphonic acid group or alkali metal salt thereof. An analysis of a typical dye of the present invention shows 18.02% sulphur and 5.42% nitrogen, whereas the analysis of a similar dye derived from the free sulphonic acid naphthalene compound shows 33.16% sulphur and 3.34% nitrogen.

Attempts have been made without success to convert the color derived from the free sulphonic acid naphthalene compound to the color produced by the process of the present invention by converting the sulphonic acid group of the color into a sulphonamide group. While it was possible to effect the conversion, the properties of the dyeings made with the resultant color were identical with those made with the unconverted colors. The fastness to laundering of dyeings made with the dyes of the invention is much better than the dyeings produced by thionating corresponding compounds which are similarly substituted in the naphthalene nucleus by a sulphonic acid group. The new dyes in general have somewhat better light fastness but the difference is not as great. In certain cases the tinctorial strength of the new sulphonamide dyes is distinctly greater than the dyes derived from the naphthylamine sulphonic acid intermediates. The brightness of the dyeings made with the dyes of the invention and the solubility of the dyes in dilute aqueous sodium sulphide solution compare favorably with the brightness and solubility properties of the dyes made from similar derivatives of naphthylamine sulphonic acid.

Various modifications in the process of preparing the intermediates can be used. For example, in preparing the 1-amino-naphthalene-sulphonamide, instead of converting the 1-nitro-naphthalene-6-(-7 or -8) sulphonic acid to the sulphon chloride and then reacting this compound with ammonia or an appropriate aliphatic amine and finally reducing the nitro group to amino, all by processes well known in the art, the 1-amino-6(-7 or -8)-naphthylamine-sulphonamide can be made from 1-naphthylamine-6(-7 or -8)-sulphonic acid or from the same naphthylamine in which the amino group is protected as by acetylation. The subsequent reactions to convert to the sulphon chloride and then to react with ammonia or an aliphatic amine to form the sulphonamide are carried out, and in the case of the acylated product the acyl group is hydrolyzed off, all by processes known to the prior art.

Various suitable processes for making the indophenol and the leucoindophenol are also well known in the art. For example, other methods besides the alkaline oxidation with sodium hypochlorite can be used. The mixture of the sulphonamide and the para-amino-phenol can be oxidized in acid medium by the action of sodium dichromate. Another method comprises condensing the 1-amino-naphthalene-6(-7 or -8)-sulphonamide wtih a suitable p-nitroso-phenol or with a suitable quinone chlorimide in sulphuric acid solution.

Various modifications can be made in the process of thionation. Either the indophenols or the leucoindophenols can be used as starting materials for making the new dyes. By having present in the thionation medium a significant amount of nickel or copper, a modified or metallized dye of varied shade is produced. In the production of the metallized modifications either the metal, a sulphide of the metal or a soluble salt of the metal can be used. When the metal is used, it is preferably in a finely divided form, but the most convenient form of the metal is a soluble salt thereof, such as the chloride or sulphate. The most effective proportion of metal is about 0.2 to about 0.6 mole of metal per mole of the leuco indophenol but any amount which gives a significant effect can be used. It is known that the metal forms an integral part of the dye, probably as a closely bound complex but the structure of the metallized dye is not known. The preferred embodiments of the dyes are those which are metallized, and among these the dyes which are metallized with copper are preferred.

As the solvent used in the thionation medium, water can be used, but a lower aliphatic alcohol or an aliphatic ether of glycol or diglycol can be used instead of all or a part of the water. The shade of the product can be influenced within narrow limits by a choice of the solvent, but other properties are not affected. As the sulphur carrier, any polysulphide of an alkali metal can be used, but the sulphur:sulphide ratio has an effect on the yield. Polysulphides of less sulphur content than $Na_2S_4$ require long thionation periods and the yields are relatively small. An alkali metal polysulphide having a sulphur-sulphide ratio corresponding approximately to $Na_2S_4$ to Na2S6 gives the shortest thionations and good yields. Polysulphides containing more sulphur than Na2S6 can be used satisfactorily.

Thionation within a period of about 15 to about 20 hours gives the best results. Excessively rapid thionations give low yields, whereas excessively long thionation periods may result in dull products. The kind of solvent used in the thionation medium has a beneficial effect on the products of the thionation as well as upon the time which is necessary to complete the thionation. In thionations which are carried out at normal atmospheric pressures or at slightly reduced pressures, the preferred medium is one in which the solvent is water, an organic solvent having a higher boiling point than ethyl alcohol or a mixture of water and such a higher boiling point solvent. The temperature of such thionations is about 110° C. to about 115° C. They may be carried out at any pressure provided that at pressures above normal atmospheric pressures the hydrogen sulphide formed during the thionation should be allowed to escape. Regulation of the boiling point of the thionation medium so that refluxing can be carried on at or near normal atmospheric pressure commonly results in the desired thionation periods of about 15 to 20 hours.

Any of the numerous methods for separating the dye from the thionation medium can be used, such as aeration in an alkaline medium, digestion with sodium hydroxide or digestion with sodium bisulphite.

From the foregoing disclosure it will be recognized that the invention is susceptible of modification without departing from the spirit and scope thereof and it is to be understood that the invention is not restricted to the specific illustrations thereof herein set forth.

We claim:

1. A sulphur dye produced by thionating a suphonamide represented by the formula

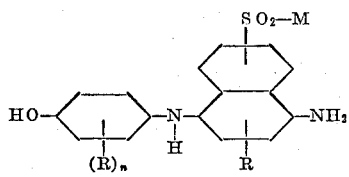

in which R is from a group consisting of hydrogen, halogen and methyl; $n$ is an integer not greater than 2; and M is one of a group consisting of primary amino, secondary-alkyl and -hydroxyalkyl amino, secondary phenyl-amino and toluyl-amino, tertiary di-alkyl amino and tertiary alkyl-hydroxyalkyl amino groups wherein the alkyl groups are lower alkyl; by heating in the presence of a polysulphide of an alkali metal.

2. The metallized complex of a sulphur dye produced by thionating a sulphonamide represented by the formula

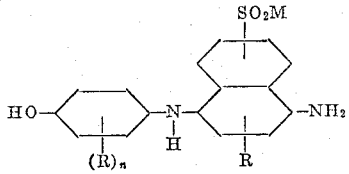

in which R is from a group consisting of hydrogen, halogen and methyl; $n$ is an integer not greater than 2; and M is one of a group consisting of primary amino, secondary-alkyl and -hydroxyalkyl amino, secondary phenyl-amino and toluyl-amino, tertiary di-alkyl amino and tertiary alkyl-hydroxyalkyl amino groups wherein the alkyl groups are lower alkyl; by heating in the presence of a polysulphide of an alkali metal and in the presence of one of a group consisting of nickel and copper salts.

3. The sulphur dye produced by thionating 1-amino-4-(4'-hydroxy-anilino)-naphthalene-6-sulphonamide in the presence of a copper salt.

4. The sulphur dye produced by thionating 1-amino-4-(4'-hydroxy-anilino)-naphthalene-7-sulphonamide in the presence of a copper salt.

5. The sulphur dye produced by thionating 1-amino-4-(4'-hydroxy-anilino)-naphthalene-6-sulphonamide.

6. The process of making a sulphur dye which comprises heating in a thionation medium a compound represented by the formula

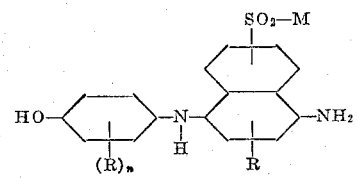

in which R is from a group consisting of hydrogen, halogen and methyl; $n$ is an integer not greater than 2; and M is one of a group consisting of primary amino, secondary-alkyl and -hydroxyalkyl amino, secondary phenyl-amino and toluyl-amino, tertiary di-alkyl amino and tertiary alkyl-hydroxyalkyl amino groups wherein the alkyl groups are lower alkyl; said thionation medium comprising sufficient of a thionating agent in the form of an alkali metal polysulphide to thionate said sulphonamide, and said sulphonamide being heated until it is thionated; and then separating the thionated product from said medium.

7. The process in accordance with claim 6 in which about 0.2 to about 0.6 mole of a metal of the group consisting of copper and nickel is present in the thionation medium per mole of the leuco indophenol.

HERBERT A. LUBS.
NEWELL M. BIGELOW.

CERTIFICATE OF CORRECTION.

Patent No. 2,344,624.                                          March 21, 1944.

HERBERT A. LUBS, ET AL.

It is hereby certified that error appears in the printed specification of the above numbered patent requiring correction as follows: Page 3, second column, line 39-40, for "dichloro-amino-phenol" read --dichloro-p-amino-phenol--; and that the said Letters Patent should be read with this correction therein that the same may conform to the record of the case in the Patent Office.

Signed and sealed this 6th day of November, A. D. 1945.

Leslie Frazer (Seal)                                   First Assistant Commissioner of Patents.